(12) United States Patent
Zborovskiy et al.

(10) Patent No.: US 7,734,525 B2
(45) Date of Patent: Jun. 8, 2010

(54) HYBRID MULTI-THREAD AND MULTI-PROCESS COMPUTER SIMULATION SYSTEM AND METHODS

(75) Inventors: Mikhail Zborovskiy, Brooklyn, NY (US); Dimitri Turchin, New York, NY (US)

(73) Assignee: Morgan Stanley, New York, NY (US)

( * ) Notice: Subject to any disclaimer, the term of this patent is extended or adjusted under 35 U.S.C. 154(b) by 99 days.

(21) Appl. No.: 11/527,324

(22) Filed: Sep. 26, 2006

(65) Prior Publication Data
US 2007/0208649 A1     Sep. 6, 2007

Related U.S. Application Data

(60) Provisional application No. 60/721,239, filed on Sep. 27, 2005.

(51) Int. Cl.
*G06Q 40/00* (2006.01)
(52) U.S. Cl. .................... 705/36 R; 705/35; 705/37
(58) Field of Classification Search ............. 705/35–45
See application file for complete search history.

(56) References Cited

U.S. PATENT DOCUMENTS 6,061,662 A * 5/2000 Makivic ................ 705/36 R
6,192,388 B1 * 2/2001 Cajolet ..................... 718/100
6,792,399 B1 * 9/2004 Phillips et al. ............ 705/36 R
2003/0135448 A1 * 7/2003 Aguias et al. ................ 705/38
2005/0021438 A1 * 1/2005 Tezuka et al. ................ 705/36
2005/0119965 A1   6/2005 Kathwari et al.
2005/0209940 A1 * 9/2005 Lea et al. ..................... 705/35

OTHER PUBLICATIONS

International Search Report for International Application No. PCT/US 2006/37409 dated Jun. 16, 2008.
Written Opinion of the International Searching Authority for International Application No. PCT/US 2006/37409 dated Jun. 16, 2008.

* cited by examiner

*Primary Examiner*—Hani Kazimi
*Assistant Examiner*—Abhishek Vyas

(57) ABSTRACT

A method for performing a calculation that includes determining solutions for a plurality of problem modules. The problem modules are of differing complexities, and their solutions are combined to determine a solution to the calculation. The method may include directing each of the problem modules to at least one master server, estimating a complexity for each of the problem modules, determining a threshold complexity level, sending problem modules having a complexity exceeding the threshold complexity level to at least one slave server and obtaining solutions for the problem modules therefrom, determining solutions for problem modules having a complexity not exceeding the threshold complexity level in the master server(s), and combining the solutions for the problem modules to determine the solution for the calculation.

12 Claims, 10 Drawing Sheets

HYBRID MULTI-THREAD AND MULTI-PROCESS COMPUTER SIMULATION SYSTEM AND METHODS

CROSS REFERENCE TO RELATED APPLICATION

This application claims priority from the U.S. Provisional Patent Application Ser. No. 60/721,239 filed on Sep. 27, 2005, the disclosure of which is incorporated herein by reference.

FIELD OF THE INVENTION

The present invention is directed generally and in various embodiments to computer simulation systems and methods, and more particularly, to hybrid multi-thread and multi-process computer simulation systems and methods for pricing trades in an investment portfolio in order to determine credit exposure.

BACKGROUND

The general problem addressed by this application is as follows. A computer system is required to obtain solutions to a very large number of independent problems and then generate a comprehensive result based on the solutions. The individual problems may be of widely-differing complexity and may thus demand widely-differing amounts of computational time to solve. Although solving the problems may depend upon one or more common inputs, the problems are independent in that each may be solved without reference to the solution obtained for any of the others. As used herein, the term "problem module" refers to each of the independent problems.

The specific problem addressed by this application is that of evaluating credit exposure associated with an investment portfolio. In particular, it is frequently necessary for investment portfolio owners to quantify their credit exposure to each counterparty within a given investment portfolio. The portfolio typically comprises a collection of counterparties, with each counterparty obligated to make payments to the portfolio owner and/or perform other duties in accordance with one or more financial instrument transactions, referred to herein as "trades". The financial instruments underlying each transaction may be, for example, derivative instruments such as call or put options having a value dependent upon some financial asset, commodity index, predefined variable, or a combination thereof. The total credit exposure of the portfolio owner to each counterparty may be represented as a sum of a current exposure and a potential exposure. The current exposure represents the maximum loss that the portfolio owner would incur if the counterparty would currently fail to perform its obligations (i.e., default). The potential exposure represents the maximum loss that would be incurred if the counterparty would default at a future date prior to the maturity of the instrument. Credit exposure determinations by the portfolio owner may be used for, among other things, approving additional transactions with a counterparty based upon a predetermined credit limit for that counterparty and for credit risk valuation.

Because a determination of potential exposure is inherently speculative, statistical models are frequently employed for simulating a portfolio owner's potential exposure to each counterparty within a given portfolio. As a first step, such models typically simulate a large number of market scenarios based upon, among other things, one or more market risk factors affecting values of trades associated with each counterparty. Such risk factors may include, for example, future prices of traded assets, interest rates, and currency exchange rates. Each market scenario may, for example, provide numerical values for such factors at a plurality of time horizons, for example, each month for a specified period of time. Each scenario may also include a probability representing the likelihood of its occurrence.

The time over which the market scenarios are simulated may be selected based upon the time remaining until the maturity of financial instruments underlying the trades. Creation of simulated market scenarios may be implemented, for example, using known Monte Carlo simulation techniques. Upon creation of the simulated market scenarios, each trade associated with a particular counterparty may be priced over the time horizons for each simulated market scenario. Based upon the determined pricings, the portfolio owner's potential exposure to the counterparty with respect to each simulated market scenario may be determined. The potential exposures for all of the simulated market scenarios may then be statistically analyzed in order to determine an overall estimate of portfolio owner's potential exposure to the counterparty. If necessary, the estimated potential exposures of counterparties within a portfolio may be combined to determine an estimate of the potential exposure represented by the entire portfolio.

The process of pricing trades in order to determine an estimate of a portfolio owner's credit exposure to each counterparty within a portfolio is computationally intensive. In particular, large investment portfolios routinely comprise tens of thousands of counterparties, with each counterparty contractually obligated to the portfolio owner under one or more transactions. Where a large number of market scenarios (e.g., 1000-2000) is created, as well as a substantial number of time horizons for the scenarios, the number of pricing computations necessary may easily be on the order of tens of billions. The ability of the portfolio owner to make real-time investment decisions based upon credit exposure is thus generally limited by the amount of time required to perform such pricing computations.

The determination of credit exposure is an example of the general problem cited above. In particular, the problem modules cited for the general problem correspond to the calculation of credit exposure for the individual trades associated with a particular counterparty. The determination of credit exposure falls within the scope of the general problem because the credit exposure for each individual trade may be calculated without reference to the credit exposure for any other trade. Because the complexity of trades typically varies widely in scope, calculating credit exposure for the individual trades generally requires widely-differing amounts of computational time.

Pricing trades for determining a portfolio owner's potential exposure has historically been performed using a multi-threaded process approach. FIG. 1 is a block diagram of a prior art computer system for implementing a multi-threaded process approach. As, shown in FIG. 1, a root script 15 initiates a multi-threaded process 20 on each of a plurality of master servers 25 operating in parallel. The root script 15 may be executed, for example, on a control server 16 in communication with each of the master servers 25. Within each master server 25, each thread 30 of the multi-threaded process 20 is implemented within a corresponding server engine 35 and is operative for pricing a trade 40 for a given counterparty 45 over one or more of the simulated market scenarios. Because the number of threads 30 that may be simultaneously implemented by each master server 25 is limited, a considerable amount of time is typically required for each multi-threaded process 20 to price all trades 40 associated with a given counterparty 45 based on the simulated market scenarios.

The time required for each multi-threaded process 20 to price the trades 40 for a given counterparty 45 is largely determined by the number and complexity of the trades 40. In particular, whereas certain of the trades 40 may be simple and thus priced relatively quickly, other trades 40 may be more complex and require significantly more time for pricing. Each trade 40 may have associated with it an algorithm that is to be run for each of the market scenarios over each of the time horizons. The type of trade 40 determines the complexity of the algorithm and the time required for it to run.

Computer systems utilizing purely multi-threaded processes for pricing counterparty trades 40, such as that of FIG. 1, perform all of the pricing computations for a given counterparty 45 within a single process. Although such systems may complete pricing computations in an acceptable period of time where the trades 40 are relatively non-complex, the presence of complex trades 40 may require an unacceptably long time period in order to compute the pricing computations.

SUMMARY

In one general respect, this application discloses a method for performing a calculation that includes determining solutions for a plurality of problem modules. The problem modules are of differing complexities, and their solutions are combined to determine a solution to the calculation. The method may include directing each of the problem modules to at least one master server, estimating a complexity for each of the problem modules, determining a threshold complexity level, sending problem modules having a complexity exceeding the threshold complexity level to at least one slave server and obtaining solutions for the problem modules therefrom, determining solutions for problem modules having a complexity not exceeding the threshold complexity level in the master server(s), and combining the solutions for the problem modules to determine the solution for the calculation.

In another general respect, this application further discloses a method for quantifying the credit exposure of an investment portfolio owner to a counterparty within the investment portfolio, the counterparty being obligated to the portfolio owner in accordance with a plurality of trades. The method may include sending signals indicative of the counterparty and the trades to at least one master server, estimating a complexity for each of the trades, determining a threshold complexity level, determining a price for each of the trades having a complexity not exceeding the threshold complexity level in the master server(s), sending each trade having a complexity exceeding the threshold complexity level to at least one slave server and determining a price for the trades in the slave server(s), and combining the prices for the trades to determine the credit exposure of the portfolio owner to the counterparty.

In another general respect, this application discloses a method for calculating a base complexity of trade pricing algorithms based on a plurality of scenarios. The scenarios represent future values of parameters relevant to the prices of the trades over a plurality of time horizons. Each base complexity pertains to a specific trade type and is used for estimating actual trade complexity. The method includes, for each trade type, defining a test trade embodying at least one characteristic feature of the trade type, pricing the test trade based on a plurality of the scenarios, and determining the base complexity for the trade type based on the time required to price the test trade on the plurality of scenarios.

DESCRIPTION OF THE INVENTION

Figure 2:
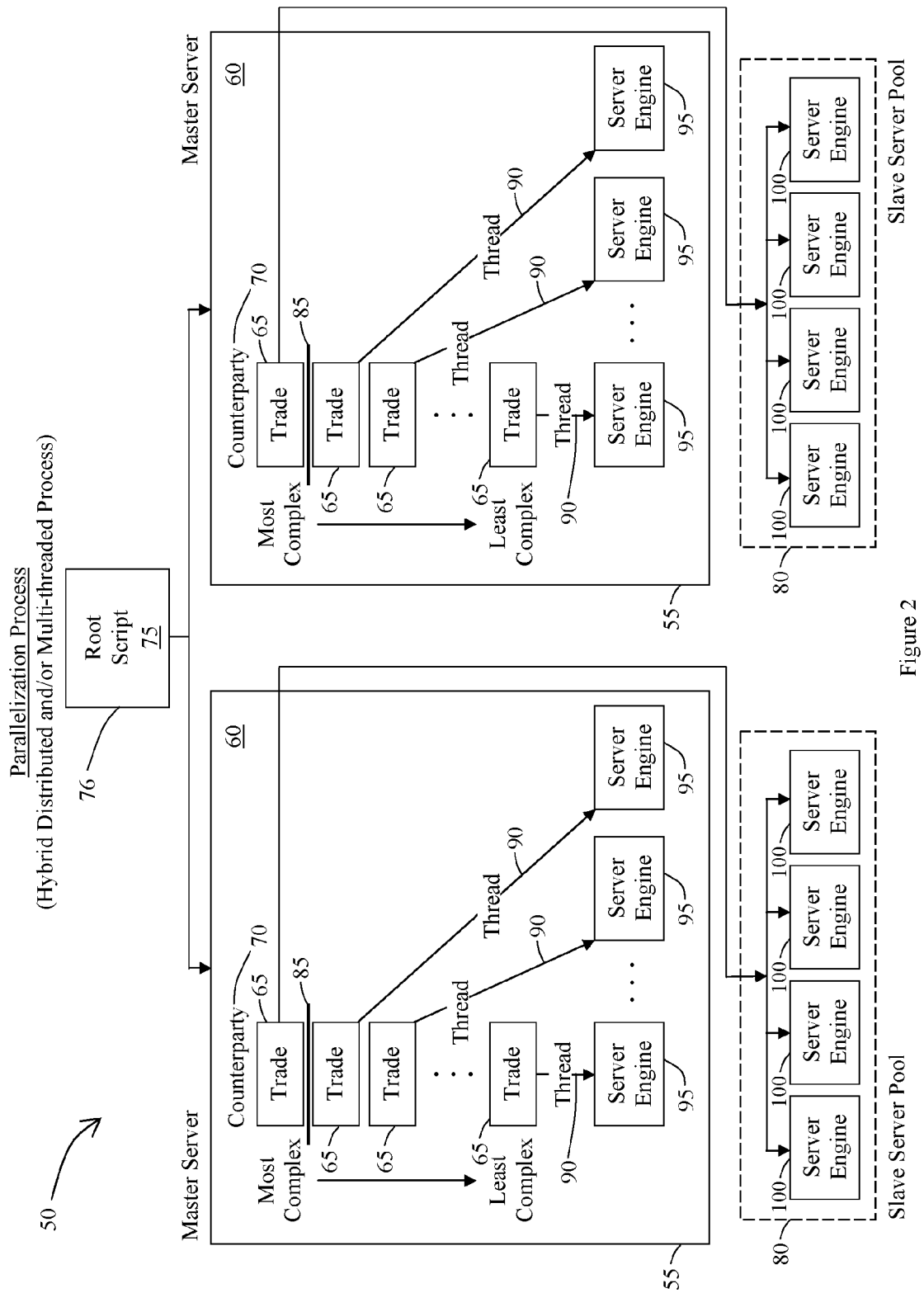
FIG. 2 is a block diagram of a computer system according to various embodiments of the present invention.

FIG. 2 is a block diagram of a computer system according to various embodiments of the present invention. The computer system 50 may comprise one or more master servers 55. According to various embodiments, each master server 55 may be operatively configured to implement a multi-threaded process 60 for pricing at least a portion of the trades 65 associated with a particular counterparty 70 for each of a plurality of simulated market scenarios. According to various embodiments, the simulated market scenarios may be pre-determined using, for example, Monte Carlo simulations of future markets. Process implementation on each master server 55 may be initiated and controlled in accordance with the output of a root script 75 executed on a control server 76 in communication with each of the master servers 55. The computer system 50 may further include one or more slave server pools 80 in communication with each master server 55. Each slave server pool 80 may comprise one or more slave server engines 100 distributed across one or more slave servers (not shown) for receiving and processing data supplied from a corresponding master server 55. As discussed below, the slave server pools 80 may collectively define a grid computing network for providing computational support to the master servers 55 as necessary.

As shown in FIG. 2, trades 65 to be priced for a particular counterparty 70 may be ordered within each master server 55 in accordance with their estimated relative complexities. The complexity of a trade 65 generally varies in accordance with the amount of time required to determine its price. For example, a trade 65 that requires 3 ms of computational time to price is more complex than a trade 65 requiring 1 ms of computation time to price. The relative complexities of the trades 65 for each counterparty 70 may be determined, according to various embodiments, based upon three components: 1) a base complexity component (sometimes referred to as the canonical-form complexity component), 2) an actual-to-base adjustment component, and 3) a time horizon adjustment component. These components reflect various factors that may affect the complexity of a trade 65, such as, for example, the number of time horizons over which the trade 65 is to be priced, the number of cash flows represented by the trade 65, and the number of simulated market scenarios over which the trade 65 is to be priced. This approach to determining trade complexity takes advantage of the fact that relative complexities of two trades of the same type (e.g., same product) may be easily estimated. For example, if pricing of a bond requires summing discounted future coupons, then pricing of a semi-annual six-year bond will take approximately twice as long as pricing of a semi-annual three-year bond because the latter has half as many cash flows. Such analysis addresses the problem of estimating the relative complexity of trades within the same product type.

The above-described approach also facilitates the estimation of relative complexities for trades of different product types. In particular, a canonical-form complexity component may be introduced for every product type and encoded with the relative adjustment of a real trade with respect to the canonical form. While choice of the canonical form for each product type can be arbitrary, it is important to accurately capture actual trade complexity with respect to the canonical form. Canonical-form complexity may then be estimated empirically by running repeated computations of the canonical forms of all product types in a controlled environment and determining the computational time required for each canonical form. The number of repeated computations can be different for different product types since the time required per computation factors out. In effect, canonical-form complexity synchronizes the computation of different products. It should be noted that the measure of complexity need not be expressed in real time units (e.g., milliseconds, years), and any complexity measure that suitably represents the relative complexities of trades may be used. For example, estimated complexities of trade A and trade B may be represented by numbers 100,000 and 200,000, respectively, which are unitless and do not represent real time. Nonetheless, because the estimated complexity of trade B is twice that of trade A, it will be understood that pricing trade B will take twice as long as pricing trade A.

Complexity of a single trade computation may thus depend on an empirically-estimated canonical form, or "initial," complexity component, and an actual-to-canonical adjustment of the initial complexity component based on actual trade facts. It should be noted that the product of these components may not yield overall trade complexity, and in certain cases (as described in connection with examples set forth below) the complexity adjustment with respect to the canonical form may be non-linear.

Complexity of a single trade computation may additionally or alternatively depend on factors in addition to the empirically-estimated canonical-form complexity component and the actual-to-canonical adjustment. In certain embodiments, for example, the minimal unit of work may be computation along a single path for all time horizons, and as a trade approaches maturity, the time required to compute price may decrease. After the trade matures, it may no longer contribute to exposure, in which case price computations for the trade may no longer be necessary. Accordingly, a third component of complexity may be an adjustment to the actual time horizons required by the computation. In some cases (e.g., a vanilla option), pricing may be invariant with respect to time to maturity, and the third component may only require computing the number of time horizons before trade maturity.

To summarize, three components may be used to determine trade complexity: (1) a canonical-form complexity component, estimated empirically; (2) an actual-to-canonical adjustment component, encoded based on pricing algorithm analysis; and (3) a time horizon adjustment component, encoded based on analysis of pricing algorithm and the actual time horizons over which the computations will be performed. The following examples illustrate determinations of complexity for different types of products.

EXAMPLE 1

Single Payment Trade

The dollar value of a "single payment" trade was defined as the product of the notional amount, the discount factor and the currency exchange rate. A payment of €1,000,000 in one-year time was chosen as the canonical form of this trade. The number of repeated computations used to estimate initial complexity was 100,000, yielding an initial complexity of 28 (the number of milliseconds needed to perform a single computation on a test machine). As noted above, the complexity need not be represented in real time units, and any suitable numerical representation may be used to indicate the initial complexity of one trade relative to another. There is no actual-to-canonical adjustment component in this example, as the time needed to price a single payment is invariant with respect to all parameters of the trade (e.g., currency, size and time to maturity). The time horizon adjustment component was therefore reduced to counting the number of time horizons of the trade before maturity. The complexity of a single payment trade is thus the product of the initial complexity and the number of time horizons before the maturity of the trade.

EXAMPLE 2

Floating Leg Trade

The value of a "floating leg" trade is the sum of the discounted future cash flows, defined as the product of the notional amount, the appropriate forward rate and the accrual period. The overall time needed to compute this trade is linear with respect to the number of future cash flows, but invariant with respect to other parameters (e.g., notional amount, currency, rates). The number of remaining cash flows is determined by the time to maturity and the frequency of payments—parameters which are part of, or can be easily inferred from, the trade description. A one-year €1,000,000 notional amount, with annual frequency, was chosen as the canonical form of this trade. This trade therefore has only a single cash flow. The selected canonical form allows simplification of the actual-to-canonical adjustment component, which becomes a multiplier equal to the number of cash flows of the actual trade. In this example, initial trade complexity was 79. The time horizon adjustment component requires iterating over the time horizons and estimating of the number of cash flows (which, as state above, may be inferred from the maturity date and the frequency of the trade).

EXAMPLE 3

Basket Default Swap Trade

For "basket default swap" trades, pricing efficiency may be increased by using two different approximation methods based on basket size. In this example, for large baskets (e.g., >20 obligors), a pricing methodology based on the Central Limit Theorem (CLT) was used. For small baskets (e.g., ≤20 obligors), a pricing methodology based on the Probability Generating Function (PGF) was used. Each methodology is non-linearly dependent on the number of obligors, but linearly-dependent on the number of premium payments. Instead of computing an initial complexity for a canonical form and subsequently computing an actual-to-canonical adjustment, a "combined" complexity estimate was estimated. The complexity of a basket computed using the PGF methodology was exponential in form (in terms of the number of obligors), and the complexity of a basket computed using the CLT methodology was represented as a second-degree polynomial. To estimate the coefficients of these formulae, a single cash flow basket was chosen and a number of pricing computations were performed using 5, 10, 15 and 20 obligors for the PGF methodology, and 20, 35, 50, 70, 100 and 150 obligors for the CLT methodology. The number of obligors was then fitted to observed CPU times using the functional forms above to yield the following equations: (wherein the number of obligors is denoted by x):

Initial complexity (CLT)=20.399*$x^2$+249.61*x−1957.2

Initial complexity (PGF)=484.84*$x^{3.04}$

The actual-to-canonical adjustment is defined to be a multiplier equal to the number of cash flows of the actual trade. The time-horizon adjustment requires iterating over the time horizons and summing the number of remaining cash flows determined by the maturity and frequency of the trade.

As shown in FIG. 2, the trades 65 may be ordered from the most to the least complex. Within each master server 55, after the trades 65 have been ordered based upon their estimated relative complexities, the trades 65 may be grouped in accordance with a complexity threshold 85. According to various embodiments, the complexity threshold 85 may be defined by a user of the system 50. In other embodiments, the complexity threshold 85 may be a pre-defined, non-adjustable value. The complexity threshold 85 operates to separate the trades 65 into a first group having complexities less than that of the complexity threshold 85, and a second group having complexities greater than or equal to that of the complexity threshold 85. In certain embodiments, the complexity threshold 85 may be selected to distribute the work load between the master servers 55 and the slave servers to determine the fastest possible solution.

The multi-threaded process 60 may next be initiated on each master server 55 in accordance with the output provided by the root script 75 of the control server 76. As shown in FIG. 2, the pricing of each trade 65 having a complexity less than the defined complexity threshold 85 may be performed locally within the corresponding master sever 55 by a single process thread 90 implemented within a corresponding server engine 95. Thus, for these trades 65, pricing computations are parallelized utilizing only the multi-threaded process 60 implemented on each master server 55.

For each trade 65 having a complexity greater than or equal to the defined complexity threshold 85, the corresponding master server 55 may initiate a separate process within one of the one or more slave server pools 80 in communication therewith. The master server 55 may then serialize data relating to each of these trades 65, as well as data relating to the simulated market scenarios, for distribution to the corresponding processes within the one or more slave server pools 80. Based upon the received serialized data, each process within the slave server pools 80 may then price the trade 65 utilizing a process thread (not shown) implemented within a corresponding slave server engine 100 of a slave server. Thus, for trades 65 of greater complexity, pricing computations are parallelized utilizing a distributed multi-process approach. Pricings generated by processes implemented within the slave server pools 80 may be serialized, communicated to the corresponding master server 55, and aggregated with pricings determined locally within the master server 55.

Figure 1:
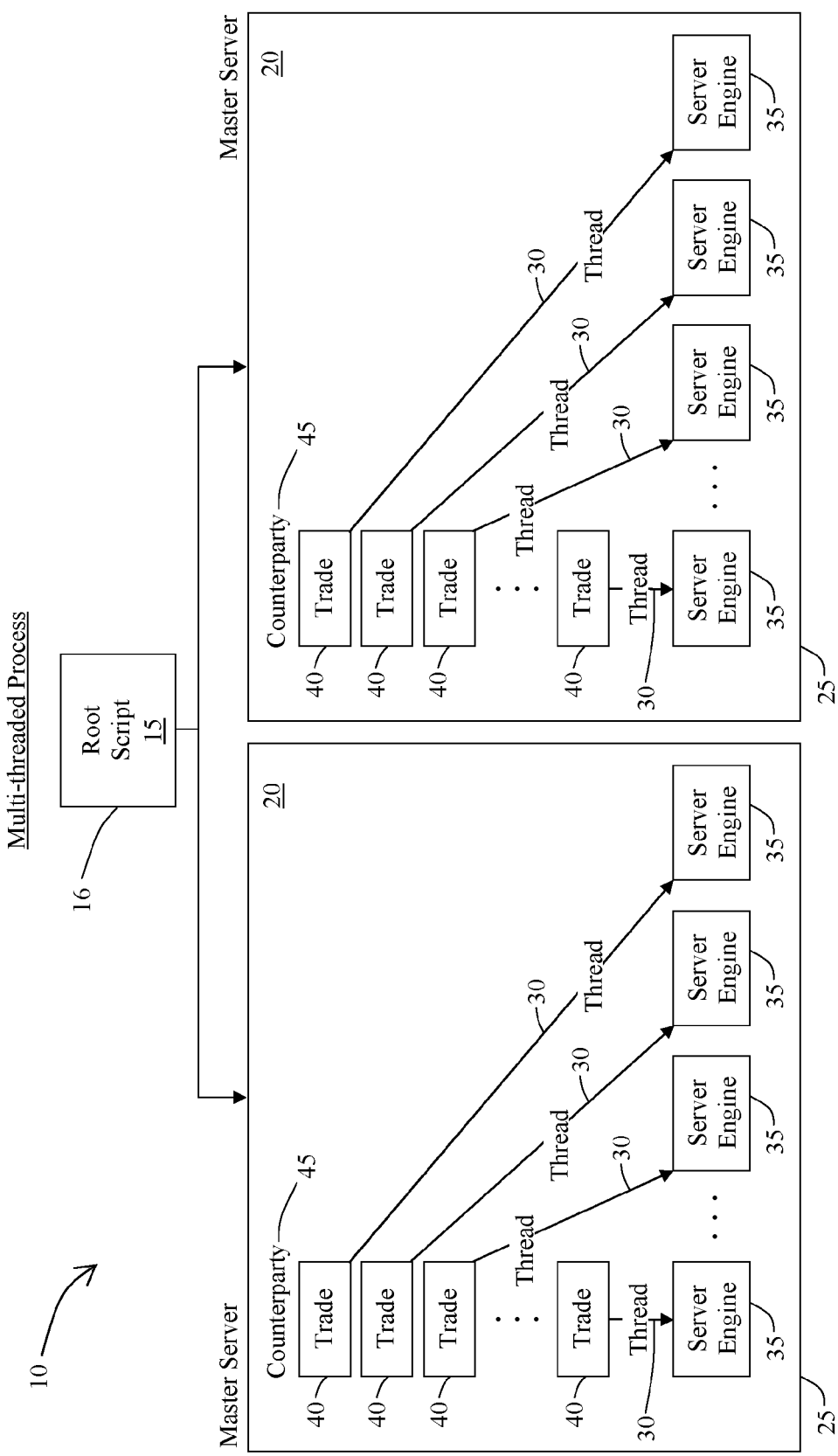
FIG. 1 is a block diagram of a prior art computer system for implementing a multi-threaded process approach.

It will thus be appreciated that the computer system 50 of FIG. 2 implements a hybrid parallelization approach wherein less complex trades 65 associated with a given counterparty 70 are priced locally using a multi-threaded process 60, and more complex trades 65 associated with the same counterparty 70 are priced remotely using distributed processes. Hybrid parallelization provides several advantages compared to systems utilizing only multi-threaded parallelization, such as the system 10 of FIG. 1. First, hybrid parallelization using multi-threading and distributed processes increases granularity. In particular, although parallelization using distributed processes increases the amount of inter-process communication, this increase is offset by the increased amount of computational resources made available through the distributed processes. Second, hybrid parallelization serves to lessen the time necessary to price all of the transactions for each counterparty 70. In particular, distributing complex trades 65 among multiple processes within the slave server pools 80 prevents such trades 65 from "bottlenecking" the multi-threaded processes 60 implemented within the master servers 55. Depending upon the number of complex trades 65, the gain in computational efficiency may substantially reduce computation times. Third, hybrid parallelization permits massive scalability. In particular, additional slave server pools 80 may be added to realize a commensurate increase in the ability of the computer system 50 to process complex trades 65.

Figure 3:
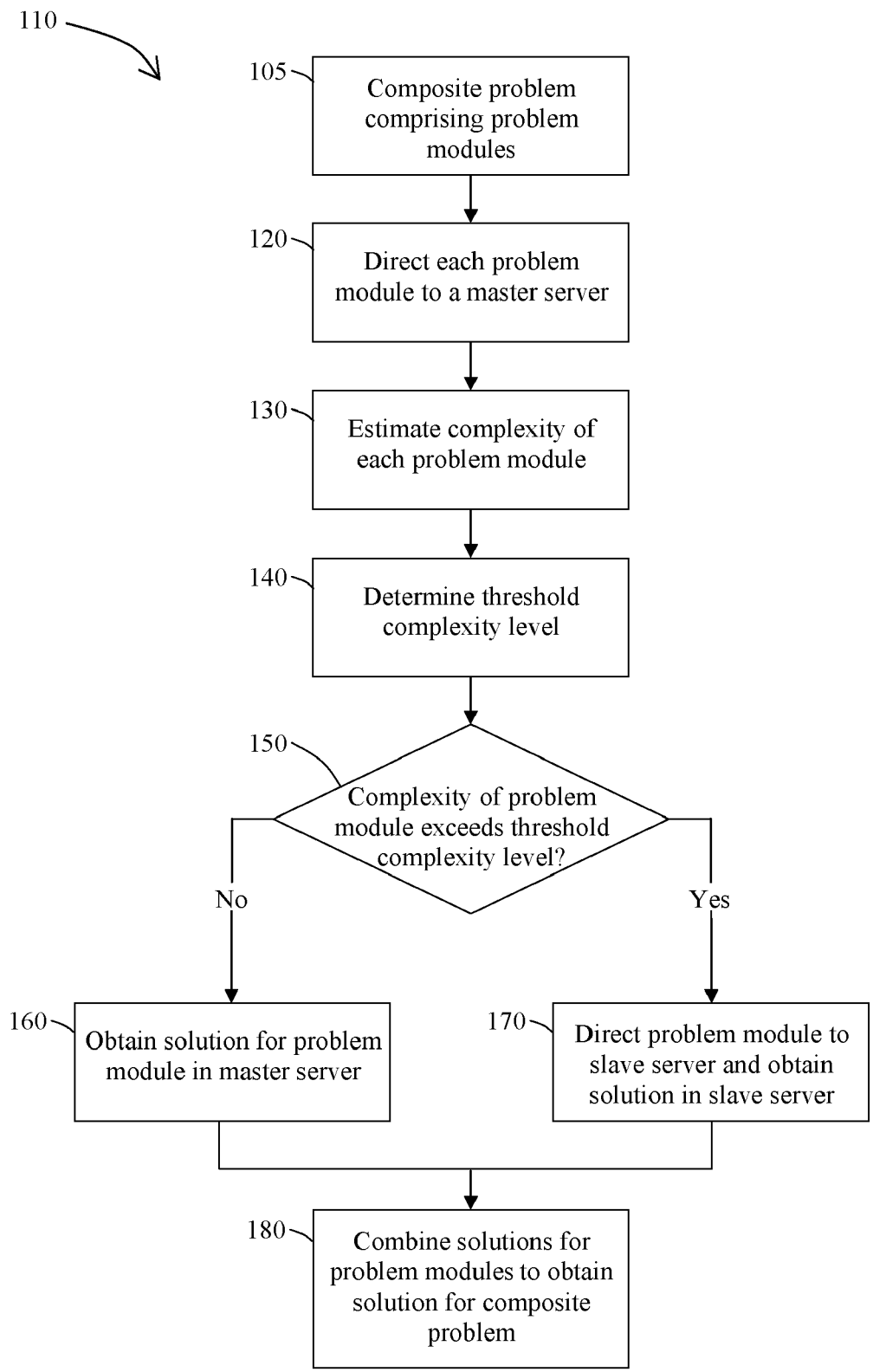
FIG. 3 is a flow diagram of a method for solving a composite problem comprised of problem modules of differing complexity according to various embodiments of the present invention.

FIG. 3 illustrates a method 110 for solving a composite problem 105 comprised of problem modules of differing complexity according to various embodiments of the present invention. In step 120, each problem module is directed to one of a plurality of master servers 55, each of which may be in communication with one or more slave server pools 80 as described above. In step 130, an estimate is made of the complexity of each problem module. In step 140, a threshold complexity level 85 is determined that serves to balance the computational load between the master servers 55 and the slave server engines 100 of the slave servers.

In step 150, the complexity of each problem module is compared with the threshold complexity level 85. Those problem modules having a complexity not exceeding the threshold complexity level 85 are processed in the master server 55 in step 160, while those problem modules having a complexity exceeding the threshold complexity level 85 are sent to a slave server engine 100 within a slave server pool 80 in communication with the master server 55 for processing.

In step 180, solutions for all the problem modules are combined to determine a solution for the composite problem 105.

Figure 4A:
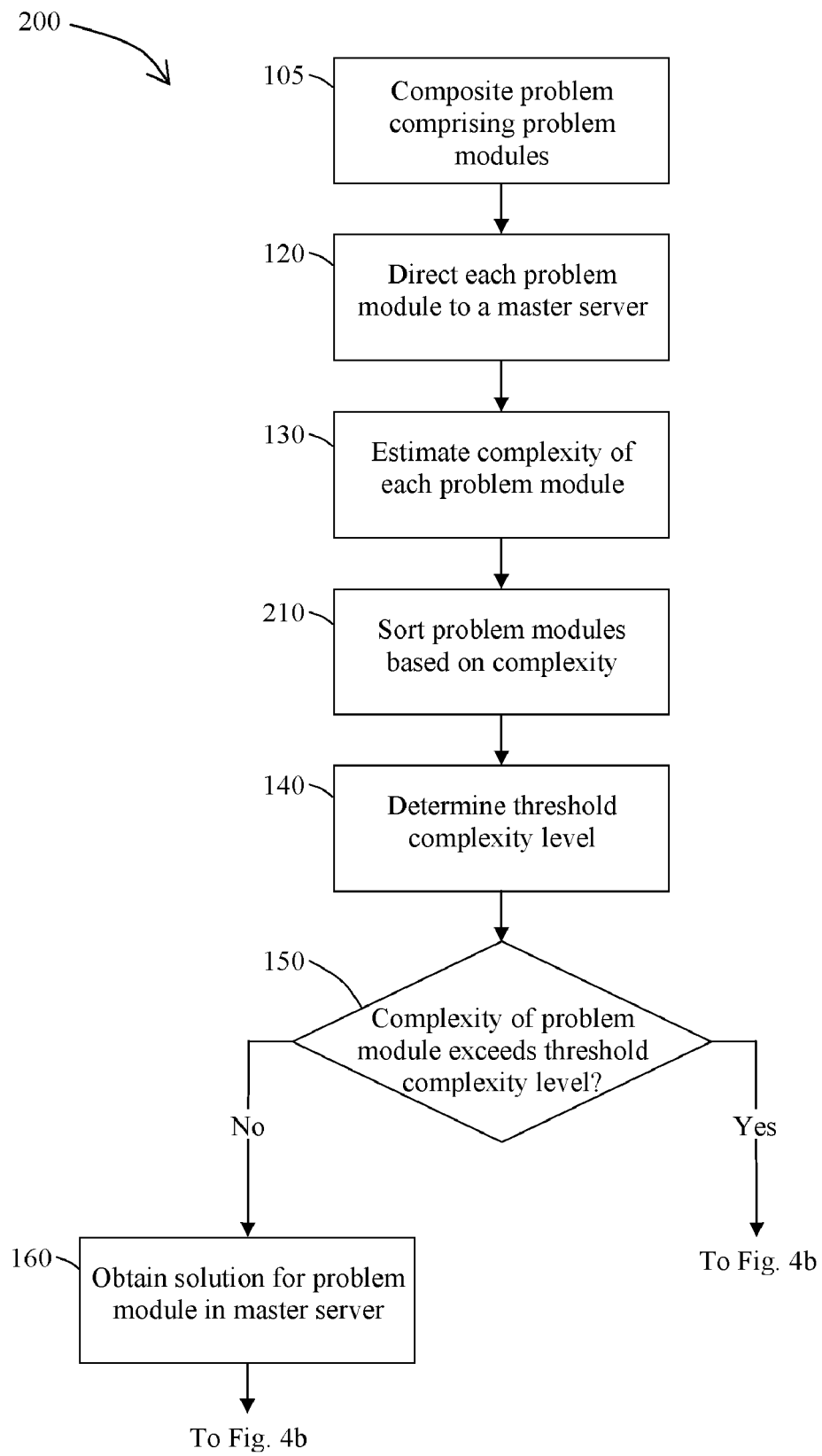
FIGS. 4a and 4b are a flow diagram of a method for solving a composite problem comprised of problem modules of differing complexity according to various embodiments of the present invention.
Figure 4B:
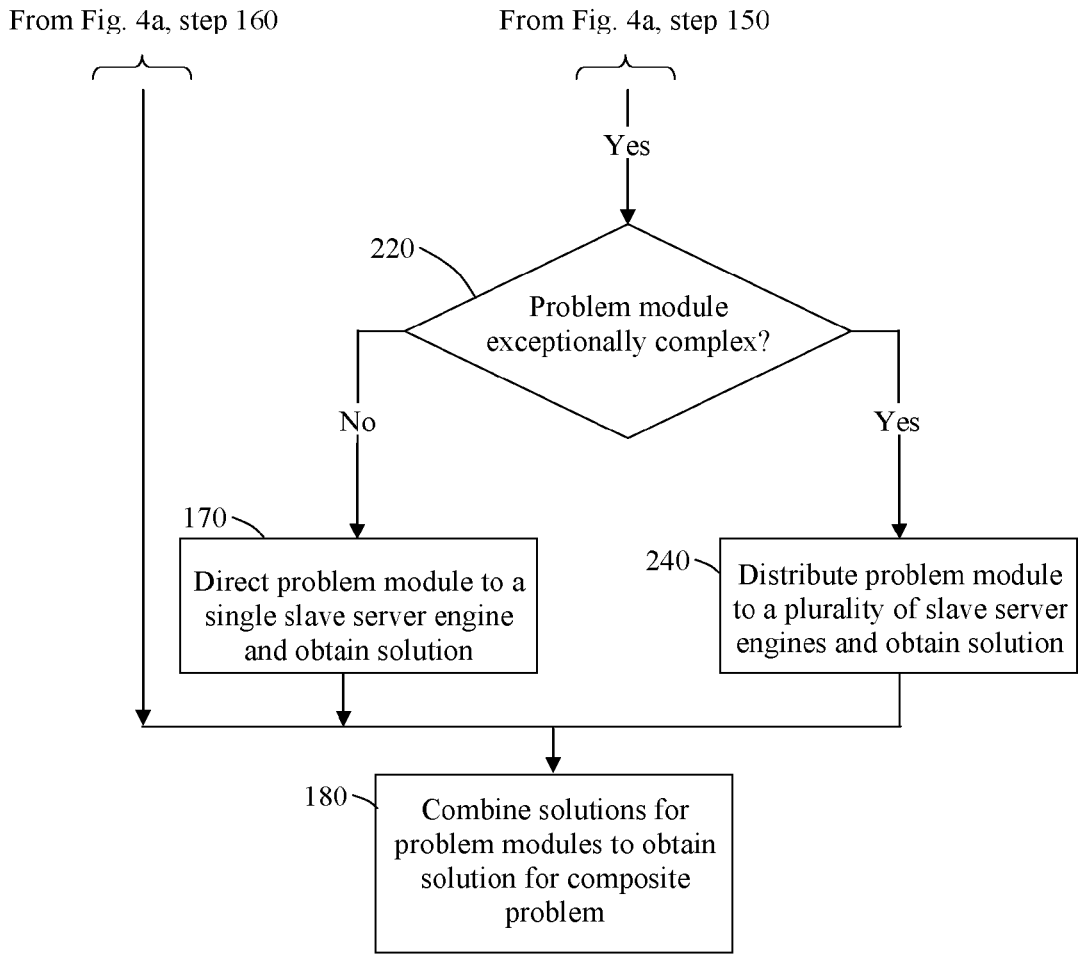

FIGS. 4a and 4b are a flow diagram of a method 200 for solving a composite problem 105 comprised of problem modules of differing complexity, some of which may be exceptionally complex, according to various embodiments of the present invention. In step 120, each problem module is directed to one of a plurality of master servers 55, each of which may be in communication with one or more slave server pools 80 as described above. In step 130, an estimate is made of the complexity of each problem module. In step 210, the problem modules are sorted based on complexity and ordered from most complex to least complex. In step 140, a threshold complexity level 85 is determined that serves to balance the computational load between the master servers 55 and the slave server engines 100 of the slave servers. Sorting the problem modules based on complexity may reduce computational time by enabling the plurality of master servers 55 and/or the slave servers to be more fully utilized. Computation tails, in which a number of servers are idle while another server finishes a particularly complex calculation, may be reduced or eliminated in this manner.

In step 150, the complexity of the problem modules is compared with the threshold complexity level 85. Those problem modules having a complexity not exceeding the threshold complexity level 85 are processed in the master server 55 in step 160, while those problem modules having a complexity exceeding the threshold complexity level 85 are tested in step 220. Those problem modules having exceptionally great complexity may be, in step 240, distributed to a plurality of slave server engines 100 for processing. Each problem module not having exceptionally great complexity may be solved in a single slave server engine 100 in step 170. In step 180, the solutions for all the problem modules may be combined to determine a solution for the composite problem. It is noted that step 210, wherein the problem modules are sorted, and step 240 wherein exceptionally complex problem modules are solved in a plurality of slave server engines 100, may be employed independently of each other, or in the same process 200.

Figure 5:
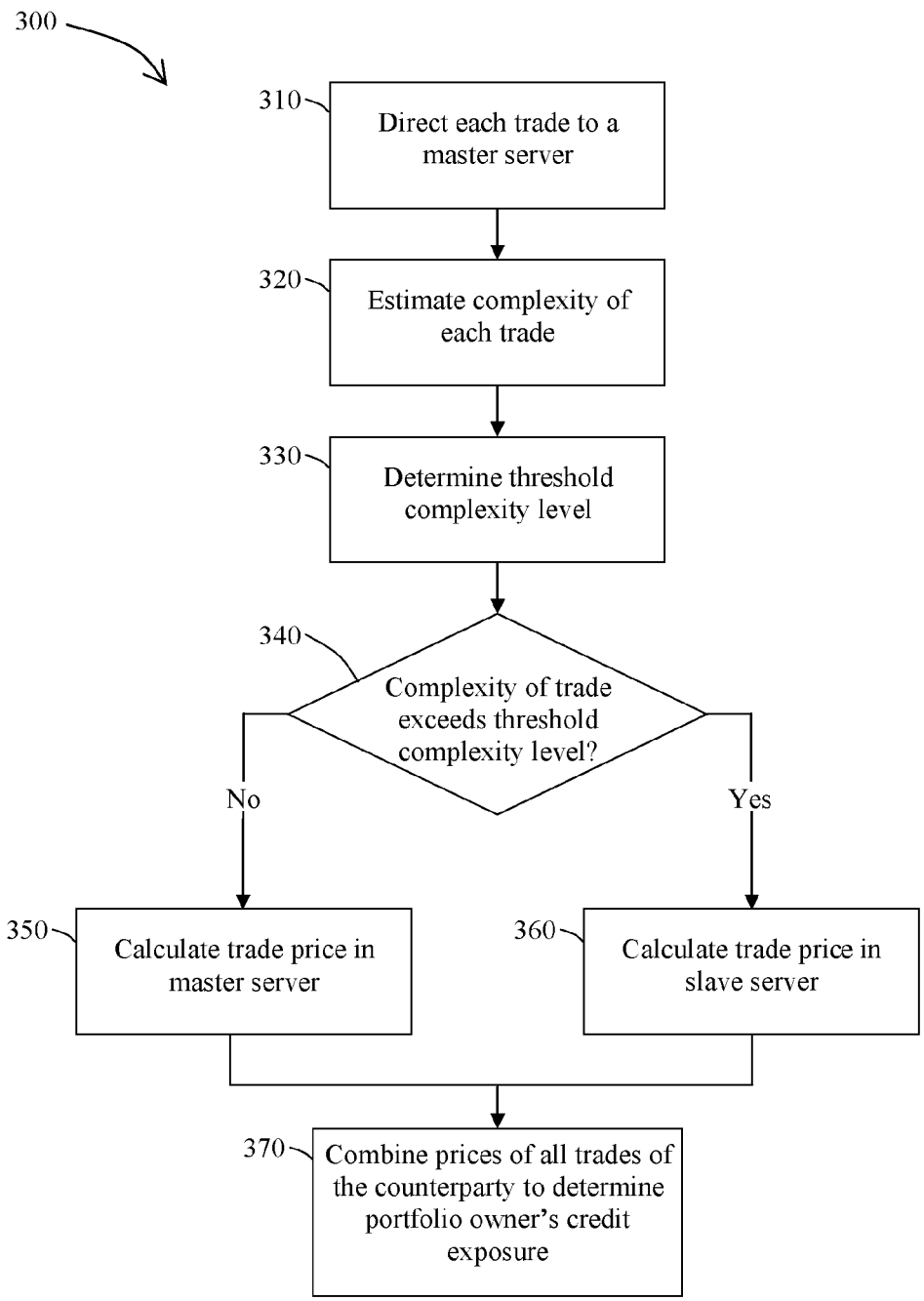
FIG. 5 is a flow diagram of a method for pricing trades in an investment portfolio according to various embodiments of the present invention.

FIG. 5 is a flow diagram of a method 300 for pricing trades 65 in an investment portfolio according to various embodiments of the present invention. The problem addressed by this method is an example of the general problem cited above. The portfolio is considered to contain a plurality of trades 65 for a plurality of counterparties 70. Method 300 is directed to pricing all of the trades 65 for one counterparty 70. Method 300 may be repeated for all the counterparties 70 to determine a price for the portfolio. The composite problem cited above corresponds to pricing all of the trades 65 of one counterparty 70. The problem modules correspond to pricing one trade 65.

A party practicing method 300 is considered to have a database including a large number of scenarios, each scenario specifying values for a large number of economic indicators over a plurality of time horizons. The time horizons may, for example, be each month for a specified time period. Each trade 65 is priced by applying a pricing algorithm to the trade 65 using the scenarios as data.

In step 310, each trade 65 is directed to one of a plurality of master servers 55. In step 320, the complexity of each trade 65 is estimated. In step 330, a threshold complexity level 85 is determined. In step 340, the complexity of each trade 65 is compared with the threshold complexity level 85. If the estimated complexity for a particular trade 65 does not exceed the threshold complexity level 85, the price of the trade 65 is calculated in step 350 in the master server 55. If the complexity of the trade 65 exceeds the threshold complexity level 85, then, in step 360, the trade 65 is priced in one of the slave server engines 100 of the slave server pool 80. In step 370, the prices of all the trades 65 are combined to determine the portfolio owner's credit exposure to the counterparty 70.

Figure 6:
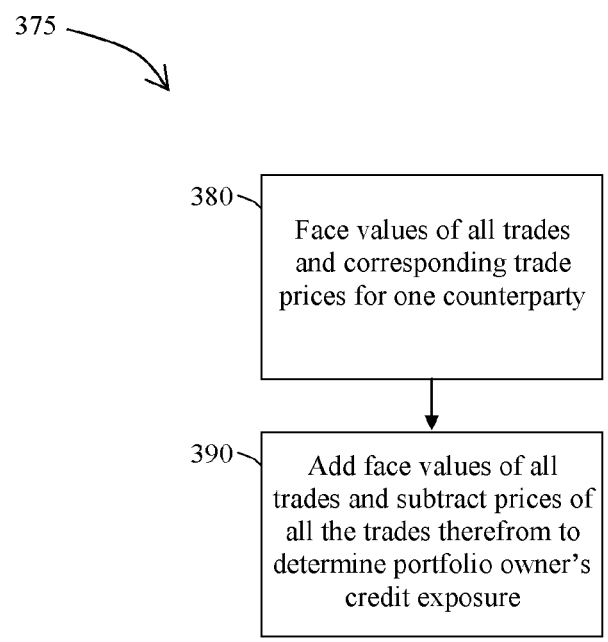
FIG. 6 is a flow diagram of a method for determining a portfolio owner's credit exposure to a counterparty based on prices of trades in the portfolio according to various embodiments of the present invention.

FIG. 6 is a flow diagram of a method 375 for determining a portfolio owner's credit exposure to a counterparty 70 based on prices of trades 65 in the portfolio according to various embodiments of the present invention. The method 375 employs a database 380 that contains the notional values, or face values, of all the trades 65 of the counterparty 70, as well the calculated prices for each. In step 390, all of the notional values are added, and the calculated prices are subtracted therefrom to determine the portfolio owner's credit exposure to the counterparty 70.

Figure 7A:
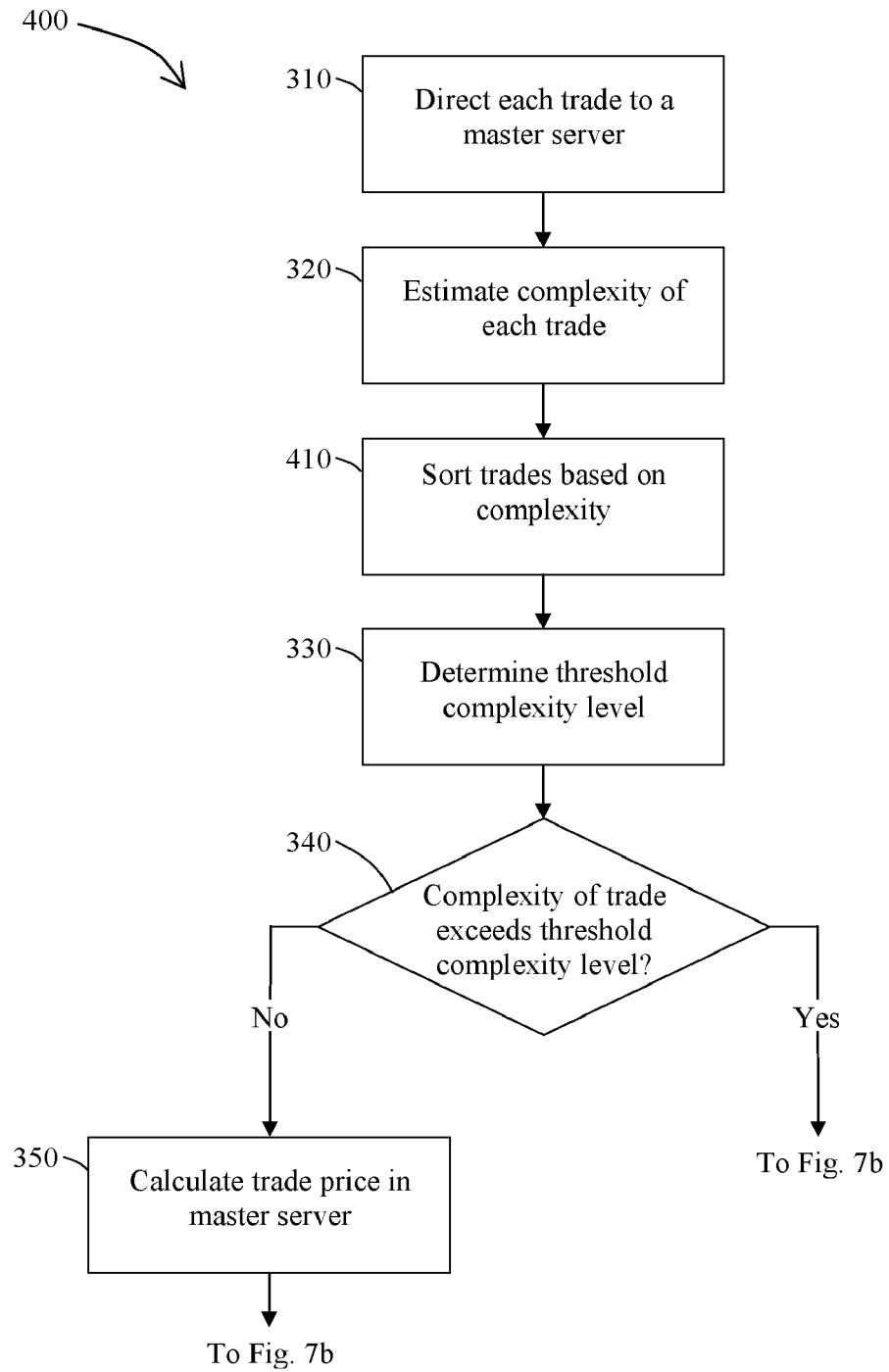
FIGS. 7a and 7b are a flow diagram of a method for pricing trades in an investment portfolio according to various embodiments of the present invention.
Figure 7B:
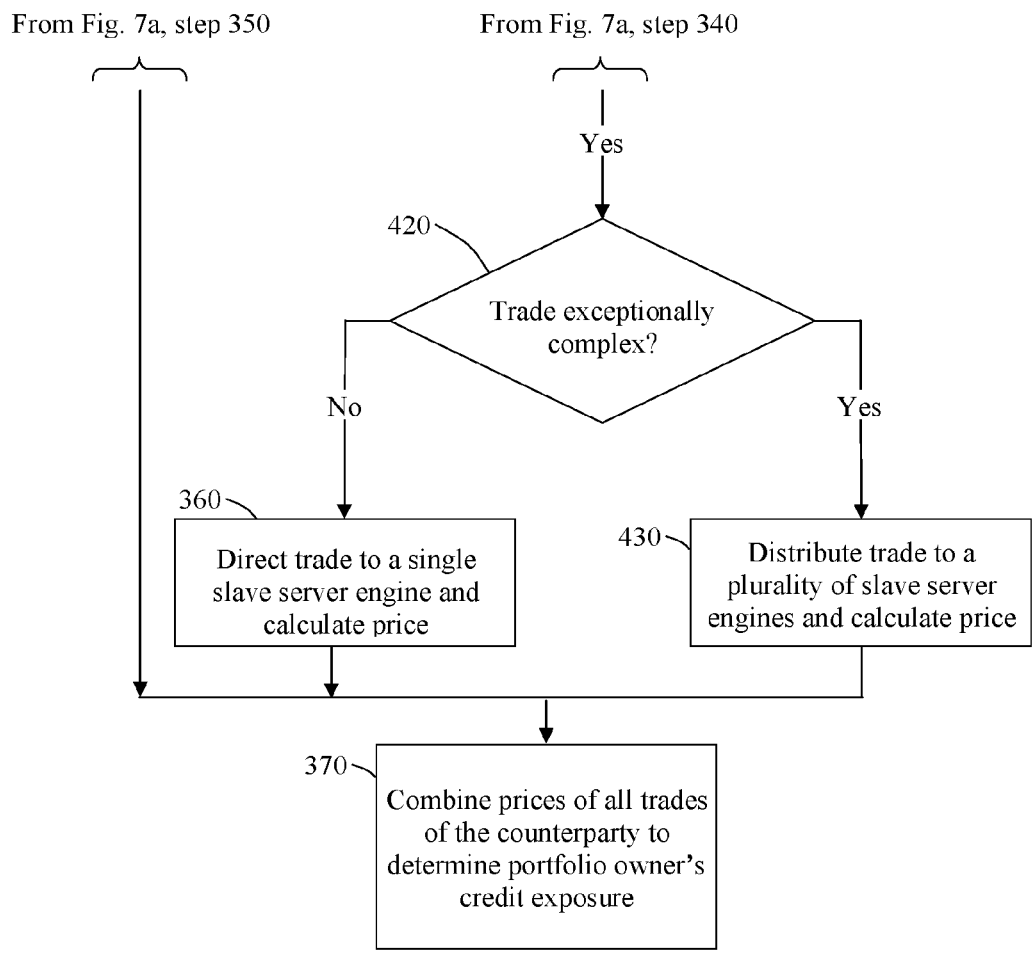

FIGS. 7a and 7b are a flow diagram of a method 400 for pricing trades 65 in an investment portfolio according to various embodiments of the present invention. As in method 300, in step 310, each trade 65 of the counterparty 70 is directed to one of a plurality of master servers 55, and in step 320, the complexities of the trades 65 are computed. In optional step 410, the trades 65 are sorted and ordered from the most to the least complex.

As in method 300, method 400 further includes step 330 to determine a threshold complexity level 85, and each trade 65 is tested in step 340 to determine whether its complexity exceeds the threshold complexity level 85. If the complexity of a trade 65 does not exceed the threshold complexity level 85, then its price is determined in step 350 in master server 55. If its price exceeds the threshold complexity level 85, then it is tested again in optional step 420 to determine whether it has exceptionally great complexity. If it does not have exceptionally great complexity, then its value is determined in step 360 in one of the slave server engines 100 of the slave computer pool 80. If it does have exceptionally great complexity, then, in step 430, it is distributed to a plurality of slave server engines 100 in the slave computer pool 80 for processing. For example, one group of scenarios for the trade 65 may be processed in one slave server engine 100 and another group in a different slave server engine 100. In step 370, prices for all the trades 65 are combined to determine the portfolio owner's credit exposure to the counterparty 70.

Figure 8:
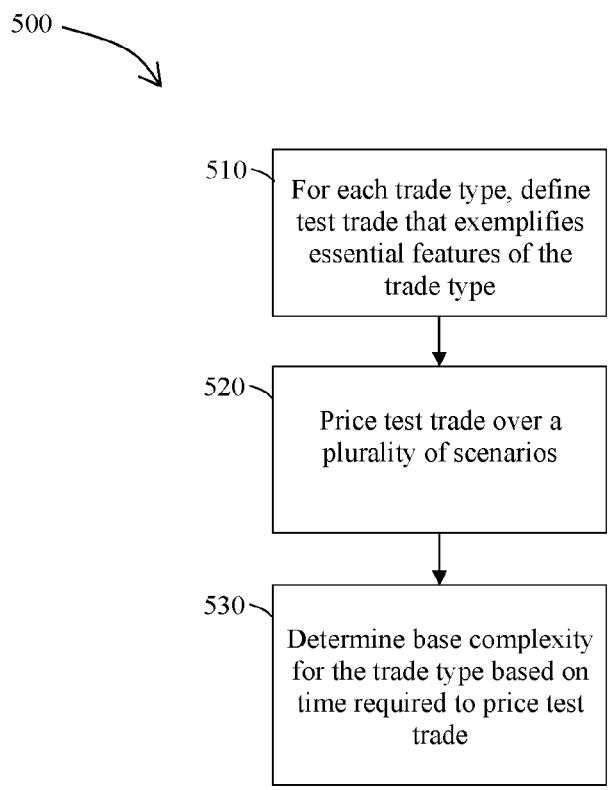
FIG. 8 is a flow diagram of a method for determining a base complexity for a trade according to various embodiments of the present invention.

FIG. 8 is a flow diagram of a method 500 for determining a base complexity for a trade 65. In step 510 a test trade is selected that embodies one or more characteristic features of a particular type of trade (e.g. a "floating leg" trade). In step 520, the test trade is priced over a plurality of scenarios by employing a computer system that, preferably, has no other programs running. In step 530, the time required to price the test trade over the plurality of scenarios is used to determine the base complexity of the trade type.

The actual estimated complexity of a particular trade type is the base complexity modified by the actual facts of the trade 65, and the number of time horizons over which it is to be evaluated.

As used herein, a "server" may be, for example and without limitation, either alone or in combination, a personal computer (PC), main frame, microcomputer, minicomputer, laptop, personal data, processor, including wireless and/or wireline varieties thereof, and/or any other computerized device capable of configuration for processing data for standalone application and/or over a networked medium or media. Servers disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Servers disclosed herein may operate according to software code to be executed by a processor or processors of the server or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent, however, that various modifications, alterations and adaptations to those embodiments may occur to persons skilled in the art with the attainment of some or all of the advantages of the disclosed invention. Therefore, this application is intended to cover all such modifications, alterations and adaptations without departing from the scope and spirit of the disclosed invention as defined by the appended claims.

What is claimed is:

1. A method for quantifying a credit exposure of an investment portfolio owner to a counterparty within said investment portfolio, said method comprising the following steps:
   for each trade type of a plurality of trade types, empirically determining a base complexity based on a time required to price a trade representative of said trade type, said representative trade embodying one or more parameters of said trade type;
   determining, by a computer system comprising a first server and at least one second server, relative complexities for a plurality of trades of said investment portfolio, said plurality of trades representing obligations of said counterparty to said portfolio owner, wherein determining said relative complexities comprises:
      electronically receiving, by said first server, data identifying said counterparty and said plurality of trades, wherein said first server comprises a processor and a computer-readable medium;
      for each of said plurality of trades of said investment portfolio:
         defining a first complexity for said trade that is equal to said base complexity of a corresponding one of said plurality of trade types;
         analytically determining a second complexity for said trade based on:
            a first modification of said first complexity based on one or more parameters of said trade when a time required to price said trade is dependent on said one or more parameters of said trade; and
            a second modification of said first complexity based on a number of time horizons over which said trade is to be priced;
      for each of said plurality of trades having a second complexity not exceeding a threshold complexity level, determining a price for said trade in said first server;
      for each of said plurality of trades having a second complexity exceeding said threshold complexity level, distributing a portion of said data received by said first server to said at least one second server to determine a price for said trade in said at least one second server; and
      determining said credit exposure of said portfolio owner to said counterparty based on an aggregation of said prices determined in said first server and in said at least one second server.

2. The method of claim 1, wherein determining said credit exposure comprises adding notional values of said plurality of trades and subtracting therefrom said aggregation of said prices.

3. The method of claim 1, wherein, for each trade having a second complexity notexceeding said threshold complexity level, said price is determined by at least one thread of a multi-thread process.

4. The method of claim 3 wherein said multi-thread process is performed on a plurality of software-based server engines.

5. The method of claim 1, wherein said trades having a second complexity less than said threshold complexity level are sorted based on relative values of said second complexity, and wherein said step of determining a price for each of said trades is performed in order of decreasing second complexity.

6. The method of claim 1 wherein said trades having a second complexity greater than said threshold complexity level are sorted based on relative values of said second complexity, and wherein said step of determining a price for each of said trades is performed in order of decreasing second complexity.

7. The method of claim 1, wherein said first server comprises a plurality of first servers, and wherein each first server is in communication with a plurality of second servers.

8. The method of claim 1, wherein said first server comprises a plurality of first servers, and wherein each of said second servers is in communication with a single one of said first servers.

9. The method of claim 1, further comprising, for at least one trade, decomposing a calculation of said trade into a plurality of calculation components and distributing said calculation components among a plurality of second servers.

10. A method according to claim 1, wherein determining a price for said trades includes representing a plurality of scenarios for future values of parameters relevant to said prices of said trades, each of said scenarios comprising future values of said parameters at a plurality of time horizons.

11. The method of claim 1 wherein said method is directed by a root script executed on a control server.

12. A computer readable medium having stored thereon instructions which, when executed by at least one processor, cause the at least one processor to:
   determine relative complexities for a plurality of trades of an investment portfolio, said plurality of trades representing obligations of a counterparty to an owner of said portfolio, wherein causing said at least one processor to determine said relative complexities causes:
      electronic receipt of data identifying said counterparty and said plurality of trades by a first server;
      for each of said plurality of trades of said investment portfolio:
         definition of a first complexity for said trade that is equal to a base complexity of a corresponding one of a plurality of trade types;
         analytical determination of a second complexity for said trade based on:
            a first modification of said first complexity based on one or more parameters of said trade when a time required to price said trade is dependent on said one or more parameters of said trade; and a second modification of said first complexity based on a number of time horizons over which said trade is to be priced;

wherein said base complexity for each of said plurality of trade types is empirically determined based on a time required to price a trade representative of said trade type, said representative trade embodying one or more parameters of said trade type;

for each of said plurality of trades having a second complexity not exceeding a threshold complexity level, determine a price for said trade in said first server;

for each of said plurality of trades having a second complexity exceeding said threshold complexity level, distribute of a portion of said data received by said first server to at least one second server to determine a price for said trade in said at least one second server; and determine said credit exposure of said portfolio owner to said counterparty based on an aggregation of said prices determined in said first server and in said at least one second server.

\* \* \* \* \*